(12) United States Patent
Karr et al.

(10) Patent No.: US 7,904,678 B1
(45) Date of Patent: Mar. 8, 2011

(54) TECHNIQUE FOR RECOVERING MIRROR CONSISTENCY IN COOPERATIVE VIRTUAL STORAGE

(75) Inventors: Ronald S. Karr, Palo Alto, CA (US); Ramana Jonnala, Sunnyvale, CA (US); Narasimha R. Valiveti, Sunnyvale, CA (US); Dhanesh Joshi, Santa Clara, CA (US)

(73) Assignee: Symantec Operating Corporation, Mountain View, CA (US)

( * ) Notice: Subject to any disclaimer, the term of this patent is extended or adjusted under 35 U.S.C. 154(b) by 460 days.

(21) Appl. No.: 10/788,589

(22) Filed: Feb. 27, 2004

(51) Int. Cl.
  *G06F 12/00* (2006.01)
  *G06F 13/00* (2006.01)
  *G06F 13/28* (2006.01)
  *G06F 9/26* (2006.01)
  *G06F 9/34* (2006.01)
  *G06F 7/00* (2006.01)
  *G06F 17/00* (2006.01)

(52) U.S. Cl. ......... 711/162; 711/161; 711/200; 711/202; 711/203; 711/205; 711/206; 711/207; 711/221; 707/640; 707/661

(58) Field of Classification Search ............ 711/112, 711/114, 200–210, 161–162; 709/227–228, 709/231, 236, 245; 370/355–356; 707/203–204
See application file for complete search history.

(56) References Cited

U.S. PATENT DOCUMENTS

| | | | | |
|---|---|---|---|---|
| 5,592,618 A * | 1/1997 | Micka et al. | | 714/54 |
| 6,088,697 A * | 7/2000 | Crockett et al. | | 707/10 |
| 6,128,627 A * | 10/2000 | Mattis et al. | | 707/202 |
| 6,606,682 B1 * | 8/2003 | Dang et al. | | 711/113 |
| 6,668,304 B1 * | 12/2003 | Satran et al. | | 711/112 |
| 6,804,755 B2 * | 10/2004 | Selkirk et al. | | 711/165 |
| 6,834,326 B1 * | 12/2004 | Wang et al. | | 711/114 |
| 7,080,198 B1 * | 7/2006 | Young | | 711/114 |
| 7,188,229 B2 * | 3/2007 | Lowe | | 711/207 |
| 7,216,133 B2 * | 5/2007 | Wu et al. | | 707/203 |
| 2004/0098544 A1 * | 5/2004 | Gaither et al. | | 711/154 |
| 2004/0267829 A1 * | 12/2004 | Hirakawa et al. | | 707/200 |
| 2005/0055523 A1 * | 3/2005 | Suishu et al. | | 711/165 |

* cited by examiner

*Primary Examiner* — Yaima Campos
(74) *Attorney, Agent, or Firm* — Campbell Stephenson LLP

(57) ABSTRACT

Disclosed is a method implementable by a computer system for maintaining consistency between mirrors of a mirrored data volume. In one embodiment, the method includes the computer system generating first and second write transactions in response to the generation of transaction to write data to a mirrored data volume. The first and second write transactions comprise first and second tags, respectively. The first and second tags relate the first write transaction to the second write transaction. In one embodiment, the first and second tags are identical. After the first and second write transactions are generated, the computer system transmits the first and second write transactions to first and second storage subsystems, respectively. In one embodiment, the first and second storage subsystems store or are configured to store respective mirrors of the data volume. Additionally, each of the first and second storage subsystems include a tag table that stores tags contained in write transactions generated by the computer system. The tag tables can be used to track write transactions received by the first and second storage subsystems.

23 Claims, 3 Drawing Sheets

TECHNIQUE FOR RECOVERING MIRROR CONSISTENCY IN COOPERATIVE VIRTUAL STORAGE

BACKGROUND OF THE INVENTION

Large scale data processing systems typically include several data storage subsystems (e.g., disk arrays) each containing many physical storage devices (e.g., hard disks) for storing critical data. Data processing systems often employ storage management systems to aggregate these physical storage devices to create highly reliable data storage. There are many types of highly reliable storage. Mirrored volume storage is an example. Mirrored volume storage replicates data over two or more mirrors of equal size. A logical memory block n of a mirrored volume maps to the same logical memory block n of each mirror. In turn, each logical memory block n of the mirrors map directly or indirectly to one or more disk blocks of one or more physical devices. Mirrored volumes provide data redundancy. If an application is unable to access data of one, a duplicate of the data sought should be available in an alternate mirror.

FIG. 1 illustrates relevant components of an exemplary data processing system 10 that employs a two-way mirrored volume. While the present invention will be described with reference to a two-way mirrored volume, the present invention should not be limited thereto. The present invention may find use with other types of redundant storage including, for example, a three-way mirrored storage volume. Data processing system 10 includes a host (e.g., server computer system) 12 coupled to data storage subsystems 14 and 16 via storage interconnect 20. For purposes of explanation, storage interconnect 20 will take form in a storage area network (SAN) it being understood that the term storage interconnect should not be limited thereto. SAN 20 may include devices (e.g., switches, routers, hubs, etc.) that cooperate to transmit input/output (IO) transactions between host 12 and storage subsystems 14 and 16.

Each of the data storage subsystems 14 and 16 includes several physical storage devices. For purposes of explanation, data storage subsystems 14 and 16 are assumed to include several hard disks. The term physical storage device should not be limited to hard disks. Data storage subsystems 14 and 16 may take different forms. For example, data storage subsystem 14 may consist of "Just a Bunch of Disks" (JBOD) connected to an array controller card. Data storage subsystem 16 may consist of a block server appliance. For purposes of explanation, each of the data storage subsystems 14 and 16 will take form in an intelligent disk array, it being understood that the term data storage subsystem should not be limited thereto.

As noted, each of the disk arrays 14 and 16 includes several hard disks. The hard disk is the most popular permanent storage device currently used. A hard disk's total storage capacity is divided into many small chunks called physical memory blocks or disk blocks. For example, a 10 GB hard disk contains 20 million disk blocks, with each block able to hold 512 bytes of data. Any random disk block can be written to or read from in about the same time, without first having to read or write other disk blocks. Once written, a disk block continues to hold data even after the hard disk is powered down. While hard disks in general are reliable, they are subject to occasional failure. Data systems employ data redundancy schemes such as mirrored volumes to protect against occasional failure of a hard disk.

Host 12 includes an application 22 executing on one or more processors. Application 22 generates ID transactions to access critical data in response to receiving requests from client computer systems (not shown) coupled to host 12. In addition to application 22, host 12 includes a storage manager 24 executing on one or more processors. Volume Manager™ provided by VERITAS Software Corporation of Mountain View, Calif., is an exemplary storage manager. Although many of the examples described herein will emphasize virtualization architecture and terminology associated with the VERITAS Volume Manager™, the software and techniques described herein can be used with a variety of different storage managers and architectures.

Storage managers can perform several functions. More particularly, storage managers can create storage objects (also known as virtualized disks) by aggregating hard disks such as those of disk arrays 14 and 16, underlying storage objects, or both. A storage object is an abstraction. FIG. 2 shows a visual representation of exemplary storage objects $V_{Example}$, $M0_{Example}$, and $M1_{Example}$ created for use in data processing system 10. Each of the storage objects $V_{Example}$, $M0_{Example}$, and $M1_{Example}$ in FIG. 2 consists of an array of $n_{max}$ logical memory blocks that store or are configured to store data. While it is said that a logical memory block stores or is configured to store data, in reality the data is stored in one or more disk blocks of hard disks allocated directly or indirectly to the logical memory block.

Storage objects aggregated from hard disks can themselves be aggregated to form storage objects called logical data volumes. Logical data volumes are typically presented for direct or indirect use by an application such as application 22 executing on host 12. Thus, application 22 generates IO transactions to read data from or write data to one or more logical memory blocks of a data volume not knowing that the data volume is an aggregation of underlying storage objects, which in turn are aggregations of hard disks. Properties of storage objects depend on how the underlying storage objects or hard disks are aggregated. In other words, the method of aggregation determines the storage object type. In theory, there are a large number of possible methods of aggregation. The more common forms of aggregation include concatenated storage, striped storage, RAID storage, or mirrored storage. A more thorough discussion of how storage objects or hard disks can be aggregated can be found within Dilip M. Ranade [2002], "Shared Data Clusters" Wiley Publishing, Inc., which is incorporated herein by reference in its entirety.

Mirrored volumes provide highly reliable access to critical data. $V_{Example}$ of FIG. 2 is an exemplary two-way mirrored volume. $V_{Example}$ was created by aggregating underlying storage objects (hereinafter mirrors) $M0_{Example}$ and $M1_{Example}$. Mirrors $M0_{Example}$ and $M1_{Example}$ were created by concatenating disk blocks from hard disks $d0_{Example}$ and $d1_{Example}$ (not shown) in disk arrays 14 and 16, respectively.

Storage managers can create storage object descriptions that describe the relationship between storage objects and their underlying storage objects or hard disks. These storage object descriptions typically include configuration maps. It is noted that storage object descriptions may include other information such as information indicating that a storage object is a snapshot copy of another storage object.

A configuration map maps a logical memory block of a corresponding storage object to one or more logical memory blocks of one or more underlying storage objects or to one or more disk blocks of one or more hard disks. To illustrate, configuration maps $CMV_{Example}$, $CMM0_{Example}$, and $CMM1_{Example}$ are created for mirrored volume $V_{Example}$ and underlying mirrors $M0_{Example}$ and $M0_{Example}$, respectively. Configuration map $CMV_{Example}$ maps each logical memory block n of $V_{Example}$ to logical memory blocks n of mirrors $M0_{Example}$ and $M1_{Example}$. Configuration map $CMM0_{Example}$ maps each logical memory block n of mirror $M0_{Example}$ to a disk block x in hard disk $d0_{Example}$, while configuration map $CMM1_{Example}$ maps each logical memory block n of mirror $M1_{Example}$ to a disk block y in hard disk $d1_{Example}$. Configuration map $CMV_{Example}$ can be provided for use by storage manager 24, while configuration maps $CMM0_{Example}$ and $CMM1_{Exampe}$ can be provided for use by storage managers 34 and 36 executing on one or more processors in disk arrays 14 and 16, respectively.

Storage managers use configuration maps to translate IO transactions directed to one storage object into one or more IO transactions that access data of one or more underlying storage objects or hard disks. To illustrate, presume an IO transaction is generated by application 22 to write data D to logical memory block 3 of data volume $V_{Example}$. This IO transaction is received directly or indirectly by storage manager 24. In turn, storage manager 24 accesses configuration map $CMV_{Example}$ and learns that logical memory block 3 is mapped to logical block 3 in both mirrors $M0_{Example}$ and $M1_{Example}$. It is noted storage manager may not receive the exact IO transaction generated by application 22. However, the transaction storage manager 24 receives will indicate that data D is to be written to block 3 of mirrored volume $V_{Example}$.

Storage manager 24 then generates first and second IO transactions to write data D to logical blocks 3 and mirrors $M0_{Example}$ and $M0_{Example}$, respectively. The IO transactions generated by storage manager 24 are transmitted to disk arrays 14 and 16, respectively, via SAN 20. Storage managers 34 and 36 of disk arrays 14 and 16, respectively receive directly or indirectly, the IO transactions sent by storage manager 24. It is noted that the IO transactions received by storage managers 34 and 36 may not be the exact 10 transactions generated and sent by storage manager 24. Nonetheless, storage managers 34 and 36 will each receive an IO transaction to write data D to logical block 3 in mirrors $M0_{Example}$ and $M1_{Example}$, respectively. Storage manager 34, in response to receiving the IO transaction, accesses configuration map $CMM0_{Example}$ to learn that block 3 of mirror $M0_{Example}$ is mapped to, for example, disk block 200 within hard disk d0. In response, a transaction is generated to write data D to disk block 200 within disk d0. Storage manager 36 accesses configuration map $CMM1_{Example}$ to learn that logical block 3 of mirror $M1_{Example}$ is mapped to, for example, disk block 300 within hard disk d1. In response, an IO transaction is generated for writing data D to disk block 300 within hard disk d1.

As noted above, while hard disks are reliable, hard disks are subject to failure. Data may be inaccessible within a failed hard disk. For this reason and others, administrators create mirrored data volumes. Unfortunately, data within mirrors of a mirrored volume may get into an inconsistent state if, for example, there is a server crash, storage power failure, or other problem which prevents data from being properly written to a hard disk. Consider the exemplary mirrored volume $V_{Example}$. Presume storage manager 24 generates first and second IO transactions to write data D to logical blocks 3 in mirrors $M0_{Example}$ and $M1_{Example}$ in response to the IO transaction generated by application 22. Further, presume host 12 may fail after the first 10 transaction is transmitted to disk array 14, but before the second IO transaction is transmitted to disk array 16. As a result, data D is written to disk block 200 within disk d0 of disk array 14, but data D is not written to disk block 300 within hard disk d1. When host 12 is restarted and exemplary volume $V_{Example}$ is made available again to application 22, mirrors $M0_{Example}$ and $M1_{Example}$ are said to be out of sync. In other words, mirrors $M0_{Example}$ and $M1_{Example}$ are no longer identical since at least block 3 in each contain different data. An IO transaction to read from logical memory block 3 of mirrored volume $V_{Example}$ could return either old or new data depending on whether the data is read from disk block 200 of hard disk d0 or disk block 300 of hard disk d1. Mirrors $M0_{Example}$ and $M1_{Example}$ should be resynchronized before either is accessed again.

A brute force method to resynchronize mirrors $M0_{Example}$ and $M1_{Example}$ is simply to presume that one mirror (e.g., $M0_{Example}$) contains correct data and copy the contents of the one mirror to the other (e.g., $M1_{Example}$). It can take hours to resynchronize using this method. A smarter resynchronization technique is possible, but it requires some preparation. This alternate technique involves using what is called a dirty region map. FIG. 2 illustrates a visual representation of an exemplary dirty region map 40 consisting of $n_{max}$ entries corresponding to the $n_{max}$ logical memory blocks within mirrors $M0_{Example}$ and $M1_{Example}$. Each entry of the dirty region map 40 indicates whether the corresponding blocks in mirrors are considered synchronized. For example, if entry n is set to logical 1, then blocks n in the mirrors are considered out of synchronization, and if n is set to logical 0, blocks n in the mirrors are considered in synchronization. Entry n in dirty region map 40 is set to logical 1 when the application 22 generates a transaction for writing data to logical block n of volume $V_{Example}$. Entry n is maintained in the logical 1 state until acknowledgement is received from both disk arrays 14 and 16 that data D has been written successfully to the disk blocks allocated to logical memory block n. However, if, using the example above, the first IO transaction to write data D to block 3 of mirror $M0_{Example}$ succeeds while the second 10 transaction to write to block 3 of $M1_{Example}$ fails, then entry 3 and dirty region map 40 will be maintained as a logical 1 indicating that logical blocks 3 in the mirrors are out of synchronization. Mirrors $M0_{Example}$ and $M1_{Example}$ can be resynchronized by copying data from $M0_{Example}$ to mirror $M1_{Example}$, but for only logical memory blocks corresponding to dirty region map entries set to logical 1.

SUMMARY OF THE INVENTION

Disclosed is a method implementable by a computer system for maintaining consistency between mirrors of a mirrored data volume. In one embodiment, the method includes the computer system generating first and second write transactions in response to the generation of transaction to write data to a mirrored data volume. The first and second write transactions comprise first and second tags, respectively. The first and second tags relate the first write transaction to the second write transaction. In one embodiment, the first and second tags are identical. After the first and second write transactions are generated, the computer system transmits the first and second write transactions to first and second storage subsystems, respectively. In one embodiment, the first and second storage subsystems store or are configured to store respective mirrors of the data volume. Additionally, each of the first and second storage subsystems include a tag table that stores tags contained in write transactions generated by the computer system. The tag tables can be used to track write transactions received by the first and second storage subsystems.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
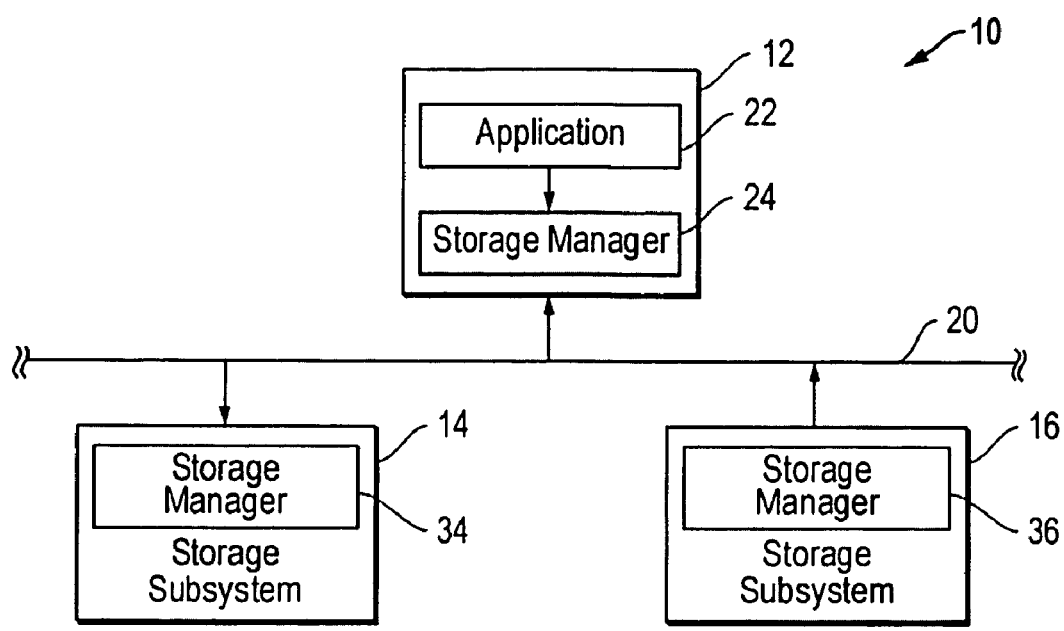
FIG. 1 illustrates a block diagram of a data system in which a logical data volume may be created.
Figure 2:
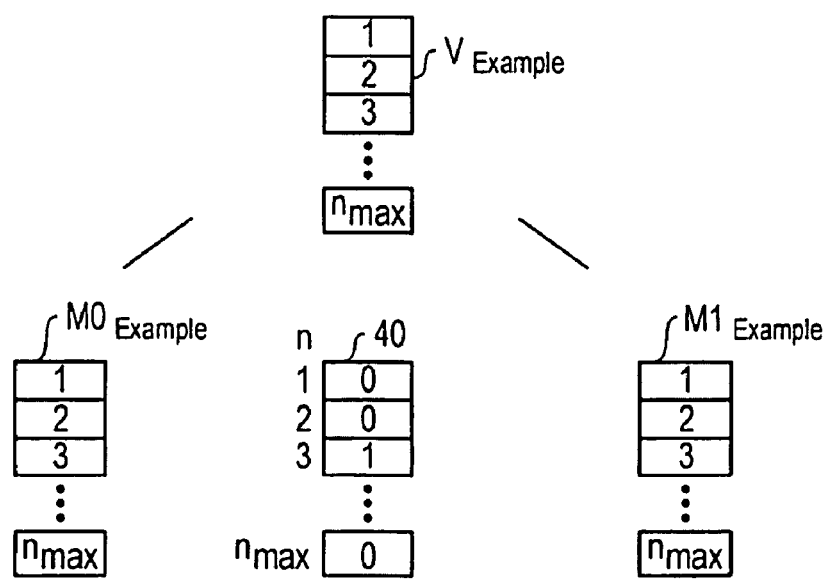
FIG. 2 illustrates a visual representation of the storage objects created in the data system of FIG. 1.
Figure 3:
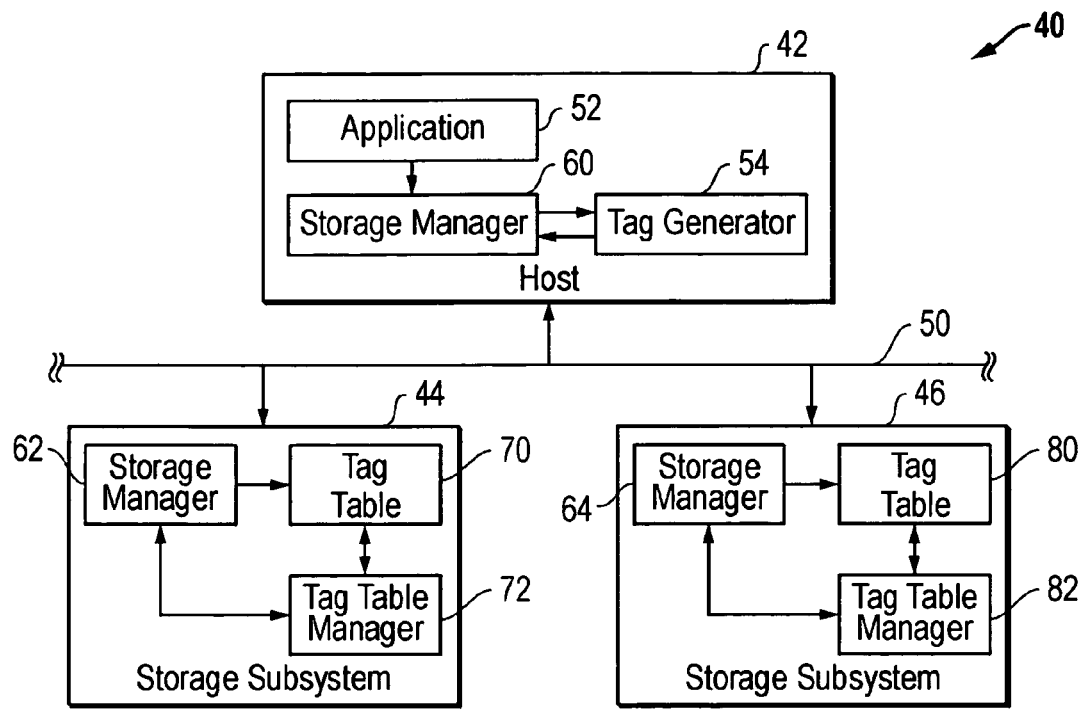
FIG. 3, illustrates a block diagram of a data system capable of implementing one embodiment of the present invention.

FIG. 3 illustrates in block diagram form, relevant components of an exemplary data processing system 40 capable of employing one embodiment of the present invention. Data processing system 40 includes a host (e.g., server computer system) 42 coupled to data storage subsystems 44 an 46 via storage interconnect 50. The present invention should not be limited to use in a data processing system consisting of only two storage subsystems. The present invention may be employed in a data processing system consisting of more than two storage subsystems.

Storage interconnect 50 takes form in a SAN consisting of several devices (e.g., switches, routers, etc.) that operate to transmit data between devices 42-46 including IO transactions to read or write data, it being understood that the term storage interconnect should not be limited thereto. SAN 50 can operate according to any one of a number of different protocols including Fibre Channel, Ethernet, etc. Each of the devices 42-46 includes one or more processors capable of processing data according to instructions of a software component such as a storage manager. As such, each of the devices 42-46 can be considered a computer system.

Data storage subsystems 44 and 46 may take different forms. For example, data storage subsystems 44 and 46 may take form in object storage devices (OSDs). Unless otherwise noted, each of the data storage subsystems 44 and 46 is implemented as a disk array, it being understood that the term data storage subsystem should not be limited thereto. Each of the disk arrays 44 and 46 includes several hard disks. Moreover, each of the disk arrays 44 and 46 may include a memory for storing a tag table that will be more fully described below.

Figure 4:
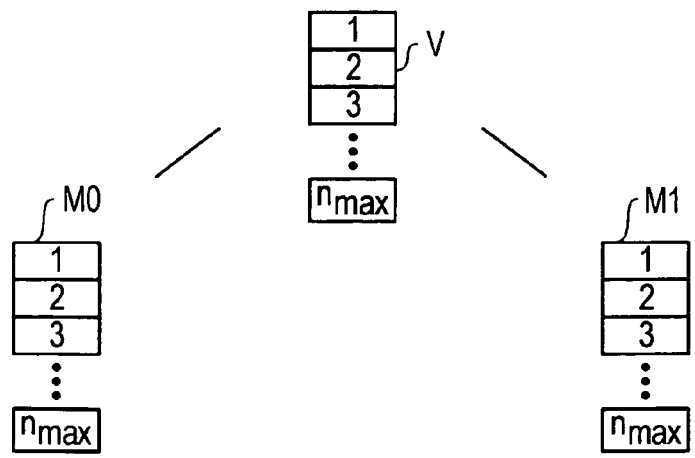
FIG. 4 shows visual representations of a mirrored data volume employed in the data system of FIG. 3.

Host 42 includes an application 52 executing on one or more processors. Application 52 may take one of many different forms. For example, application 52 may take form in a database management system (DBMS), customer relationship management software, etc. Application 52 generates IO transactions to read data from or write data to a data volume in response to receiving requests from client computer systems (not shown) coupled to host 42. Host 42 also includes a tag generator 54 executing on one or more processors. It is noted that tag generator, in an alternative embodiment, could be placed in a different device of system 40. For example, tag generator 54 could be a part of one of the disk arrays 44 or 46. For purposes of explanation, it will be presumed that the tag generator is placed in host 42 as shown in FIG. 4, unless otherwise noted. Tag generator 54 will be more fully described below.

Devices 42-46 include a storage manager 60-64, respectively, executing on one or more processors. Each of the storage managers 60-64 is capable of performing many functions. More particularly, each of the storage managers 60-64 is capable of translating IO transactions directed to one storage object into one or more IO transactions that access data of one or more underlying storage objects or hard disks of disk arrays 44 and 46. Storage managers 60-64 translate 10 transactions according to configuration maps provided thereto. For purposes of illustration, it will be presumed that application 52 is provided with access to a mirrored data volume V having two mirrors, storage objects M0 and M1. It is noted that the present invention can be employed with respect to a data volume consisting of more than two mirrors.

A visual representation of volume V and mirrors M0 and M1 is found within FIG. 4. As shown in FIG. 4, each of V, M0, and M1 consist of an array of $n_{max}$ logical memory blocks. It is noted that mirrors M0 and M1 could be formed from underlying storage objects (e.g., logical units or LUNs), or that mirrors M0 and M1 could be created as striped or RAID storage over hard disks or LUNs. It will be presumed, however, that M0 is formed by aggregating disk blocks contained within disk d0 (not shown) of disk array 44, and that mirror M1 is formed by aggregating disk blocks contained within disk d1 of disk array 46.

Storage managers 60-64 are provided with storage object descriptions for storage objects V, M0, and M1, respectively. Generally, the storage object descriptions define the relationships between storage objects and their underlying storage objects or hard disks. Moreover, the storage object descriptions may include other information. For example, the storage object descriptions for M0 and M1 indicate that M0 and M1 are mirrors or each other. As such, storage manager 62 knows that a mirror of storage object M0 is contained within storage subsystem 46, and storage manager 64 knows that a mirror of storage object M1 is contained within storage subsystem 44.

Each of the storage object descriptions may also include a configuration map. A configuration map CMV is provided to storage manager 60 which maps each logical block n of volume V to corresponding blocks n in mirrors M0 and M1. Storage manager 62 is provided with a configuration map CMM0 which maps each logical block n of mirror M0 to a disk block x within hard disk d0. Lastly, storage manager 64 is provided with a configuration map CMM1 which maps each logical block n of mirror M1 to a disk block y within hard disk d1. Storage manager 60 is capable of translating 10 transactions received from application 52 using configuration map CMV. Thus, when application 52 generates a transaction to write a data to block n of volume V, storage manager in response generates first and second transactions for writing a data D to blocks n in mirrors M0 and M1, respectively. Storage manager 62, in response to receiving an IO transaction to write data to block n of mirror M0, uses its configuration map CMM0 to identify the corresponding disk block x within disk d0 to which data D is to be written. Likewise, storage manager 64, in response to receiving an IO transaction to write data D to block n of mirror M1, uses its configuration map CMM1 to identify the corresponding disk block y within disk d1 to which data D is to be written.

IO transactions are received by storage manager 60. Tag generator 54, in response to storage manager 60 receiving an IO transaction to write data, generates a tag unique to the IO transaction to write data. This tag is provided to storage manager 60. In one embodiment, the tag may be the count value of a counter. In this embodiment, the count value is incremented by one each time storage manager 60 receives an IO transaction to write data.

Storage manager 60 accesses its configuration map CMV in response to receiving an IO transaction to write data to logical memory block n of volume V or a range of logical memory blocks beginning with block n. For purposed of explanation, it will be presumed that storage manager 60 receives IO transactions to write data to one logical block n of volume V unless otherwise noted. From configuration map CMV, storage manager 60 learns that logical block n of volume V is mapped to a logical blocks n in mirrors M1 and M0. Accordingly, storage manager 60 generates first and second 10 transactions to write data D to block n of mirrors M0 and M1. Each of these first and second IO transactions also includes the unique tag generated by tag generator 54. The first and second 10 transactions, including the unique tag, are transmitted by host 42 to disk arrays 44 and 46, respectively, via SAN 50. It is noted that the protocol employed with SAN 50 may have to be modified to accommodate IO transactions that include a unique tag.

Storage manager 62 is in data communication with nonvolatile memory 70. Likewise, storage manager 64 is in data communication with nonvolatile memory 80. Nonvolatile memories 70 and 80 are configured to store tag tables, such as tag tables 76 and 86, respectively, shown within FIG. 5. Tag tables 76 and 86 are accessible by tag table managers 72 and 82, respectively. As will be more fully described below, tag table managers 72 and 82 perform several functions including the creation or deletion entries in tag tables 76 and 86, respectively. Tag table managers 72 and 82 may take form in software instructions executing on one or more processors of disk arrays 44 and 46, respectively.

Tag tables 76 and 86 are associated with mirrors M0 and M1, respectively. It is noted that additional tag tables like tag table 76 or 86 may be contained in memories 70 and 80, where each additional tag table is associated with a mirror of a mirrored data volume provided for access to application 52. However, for purposes of explanation, it will be presumed that memories 70 and 80 store only tag tables 76 and 86, respectively.

Each tag table 76 and 86 includes a plurality of entries. Each entry stores a tag and a logical memory block number or a range of logical memory block numbers beginning with a first logical memory block number. Alternatively, each tag table entry stores a tag and a physical block number or a range of disk block numbers beginning with a first disk block number. For purposes of explanation, it will be presumed that each entry of the tag tables 76 and 86 includes a tag and a logical memory block number or a range of logical memory block numbers beginning with a first logical memory block number unless otherwise noted. To illustrate, entry 2 of tag table 76 includes a tag equal to 2 and a logical block number equal to 25, and entry 3 of tag table 76 includes a tag equal to 70 and a range of 4 logical blocks beginning with logical memory block number 29.

Tag tables 76 and 86 track write IO transactions received by storage managers 62 and 64, respectively. Entries in tag tables 76 and 86 are created by tag managers 72 and 82, respectively, each time storage managers 62 and 64, respectively, receive IO transactions to write data to minors M0 and M1, respectively. The contents (i.e., the tag and logical block number or range of logical block numbers) of the tag table entries are defined by the IO write transactions received by storage managers 62 and 64. To illustrate, presume storage manager 62 receives an IO transaction to write data to logical memory block n or a range of logical memory blocks beginning with block n of minor M0. This IO transaction includes a tag generated by tag generator 54 that is unique to the IO transaction. Storage manager 62 provides the tag and the logical block n or range of logical block numbers of the received IO transaction, to tag manager 72. Tag table manager 72, in response, creates a new entry in tag table 76. Tag table manager 72 then stores into the newly created entry of table 76 the received tag and logical block n or range of logical block numbers beginning with logical block n. After the tag and logical block n or range of logical block numbers beginning with logical block n is stored in the newly created entry, or before the tag and logical block n or range of logical block numbers beginning with logical block n is stored in the newly created entry, data of the IO transaction received by storage manager 62 is written to the disk block or blocks in disk d0 allocated to, according to CMM0, the logical block n or range of logical blocks beginning with block n of minor M0. It is noted that the foregoing process is also employed by tag table manager 82. More particularly, presume storage manager 64 receives an IO transaction to write data to logical memory block n or a range of logical memory blocks beginning with block n of minor M1. This IO transaction includes a tag generated by tag generator 54 that is unique to the IO transaction. Storage manager 64 provides the tag and the logical block n or range of logical block numbers to receiving the IO transaction, to tag manager 82. Tag table manager 82, in response, creates a new entry in tag table 86. Tag table manager 82 then stores into the newly created entry of table 86 the received tag and logical block n or range of logical block numbers beginning with logical block n. After the tag and logical block n or range of logical block numbers beginning with logical block n is stored in the newly created entry, or before the tag and logical block n or range of logical block numbers beginning with logical block n is stored in the newly created entry, data of the IO transaction received by storage manager 64 is written to the disk block or blocks in disk d1 allocated to, according to CMM1, the logical block n or range of logical blocks beginning with block n of minor M1. It is noted that in another embodiment, host 42 includes multiple, independent applications each of which is capable of generating a transaction for writing data. In this embodiment, each application may have its own tag generator that generates tags unique to that tag generator. Further in this embodiment, the tag manager of each disk array is capable of distinguishing between tags generated by different tag generators.

Tag tables 76 and 86 can be used to determine whether mirrors M0 and M1 are in synchronization. If the data processing system 40 operates perfectly, e.g., there is no crash of host 42 or interruption of power to disk arrays 44 and 46, then all IO transactions to write data to mirrors M1 and M0 should reach disk arrays 46 and 44, respectively, and the contents of tag tables 76 and 86 should be identical. However, if due to, for example, crash of host 42 one of two separate but related IO transactions do not reach disk array 44 or 46, then the contents of tag tables 76 and 86 should differ and mirrors M0 and M1 will be out of synchronization. To illustrate, suppose host 42 generates first and second IO transactions for writing data $D_{new}$ to logical block 30 in mirrors M0 and M1. Further, presume that each of these separate IO transactions includes a unique tag 51 generated by generator 54. Lastly, presume that disk array 44 receives the first IO transaction from host 42, but disk array 46 does not receive the second IO transaction. As a result, tag table manager 72 creates a new entry m in tag table 76 which includes tag 51 and block number 30 while no such corresponding tag entry is created in tag table 86. Tag table 76 indicates that logical block 30 of mirror M0 has been updated with data $D_{new}$. Since table 86 does not include a corresponding entry, it can be said that logical block 30 in mirror M1 has not been updated with data $D_{new}$, and mirrors M0 and M1 are out of synchronization.

In another embodiment, tokens can be generated by disk arrays 44 and 46 when JO transactions are received. To illustrate, presume storage managers 62 and 64 receive first and second IO transactions to write data to logical block n or a range of logical blocks beginning with block n of mirrors M0 and M1, respectively. Each of the first and second IO transactions include the same tag generated by tag generator 54 and which is unique to the first and second IO transactions. Storage manager 62 provides the tag and the logical block n or range of logical block numbers for the received first IO transaction, to tag manager 72. Likewise, storage manager 64 provides the tag and the logical block n or range of logical block numbers for the received second IO transaction, to tag manager 82. Tag table managers 72 and 82, in response, create new entries in tag tables 76 and 86, respectively. Tag table managers 72 and 82 then store into the newly created entries of tables 76 and 86 the tag and logical block n or range of logical block numbers beginning with logical block n. Thereafter each of tag managers 72 and 82 generate first and second tokens, respectively. The first and second tokens can be used to identify the newly created entries in tables 76 and 86, respectively. The tokens can be simple numbers to identify corresponding entries in the tag tables. If and when storage managers 62 and 64 return status of the first and second IO transactions, respectively, to host 42, storage managers 62 and 64 may also return the first and second tokens associated with the newly generated tag entries in tables 76 and 86, respectively. The first and second tokens could be identical to each other, but they are not required to be identical. Host 42 receives status from both disk arrays 44 and 46, and host 42 declares the first and second IO transactions as complete. Host 42 will receive the first and second tokens. Presume now that host 42 generates third and fourth IO transactions to write data to block m of mirrors M0 and M1, respectively. Because host 42 received status reply for the first and second transactions, host 42 may add the first and second tokens to the third and fourth IO transactions before they are sent to disk arrays 44 and 46, respectively. Tag managers 72 and 82 are provided with the first and second tokens. Tag managers 72 and 82 delete entries in tables 76 and 86, respectively, that correspond to the first and second tokens, respectively, received from the host. In yet another alternative, host 42 can choose a certain time interval to send to disk arrays 44 and 46 a message consisting of several tokens, but only those tokens that are ready to be sent back to disk arrays 44 and 46. A token is ready to be sent back only after all related IO transactions are completed. The several tokens are subsequently provided to tag table managers 72 and 82, and tag managers 72 and 82 then delete entries corresponding to the several tokens.

When mirrors M0 and M1 are out of synchronization, table 76 and 86 can be used to bring mirrors M1 and M0 back into synchronization. Mirrors M0 and M1 will be out of synchronization when an entry is found within table 76 that is not matched in table 86, or when an entry is found in table 86 that is not matched in table 76. When this happens, data is copied from mirror M1 to mirror M0 or from mirror M0 to mirror M1 according to the table entry that lacks the matching entry. To illustrate, tables 76 and 86 are not identical because table 76 includes an entry m consisting of a tag number 51 and logical block 30, and this entry cannot be found within table 86. To bring these mirrors M0 and M1 back into synchronization, data is copied from logical block 30 of mirror M0 to logical block 30 of mirror M1. Thereafter, entry m is deleted from tag table 76. Once this copying process is complete, and assuming there are no other mismatching entries between tables 76 and 86, mirrors M1 and M0 are back in synchronization.

Figures 5, 6:
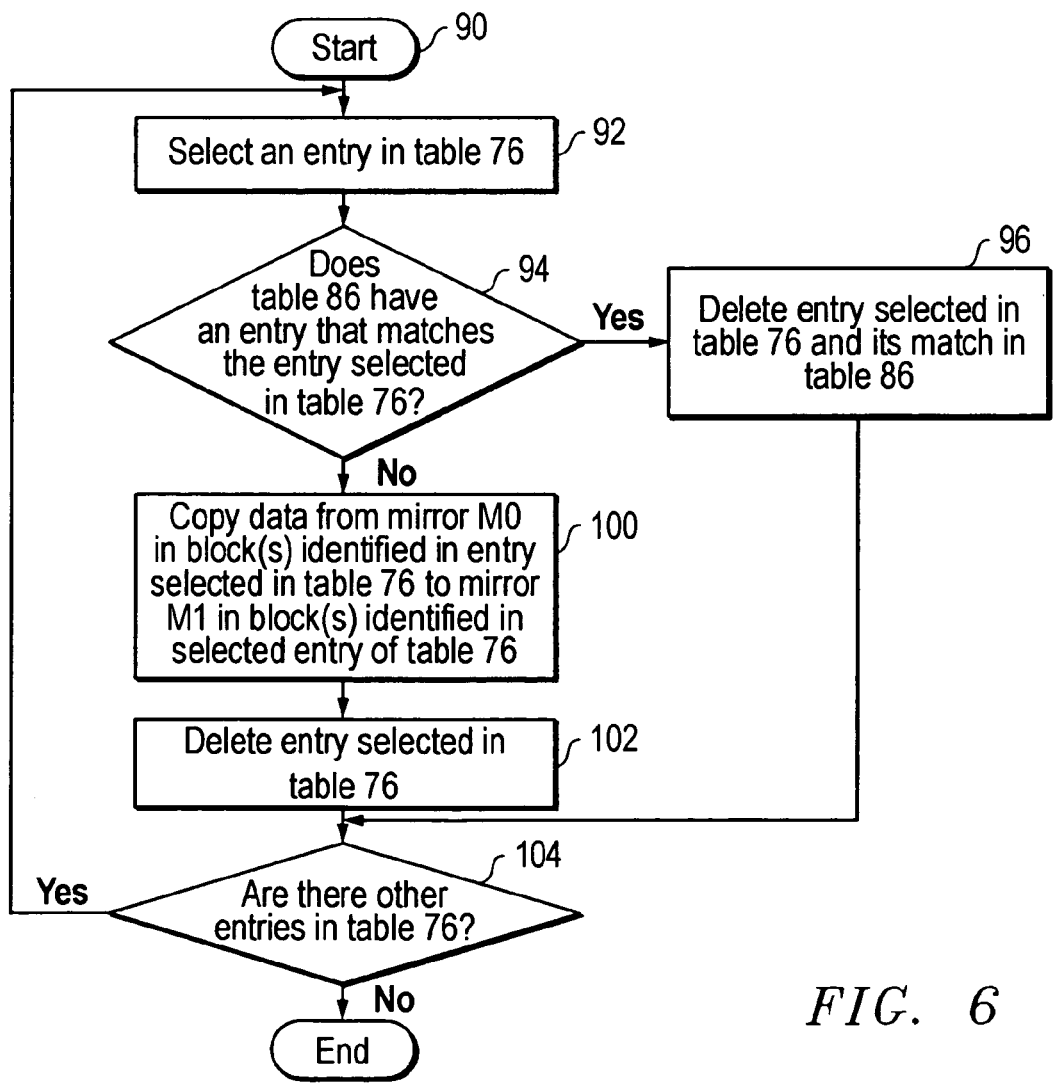
FIG. 5 is a visual representation of exemplary tag tables employed in the disk arrays of FIG. 3.
FIG. 6 is a flow chart illustrating relevant aspects of managing the tag tables shown in FIG. 5.

In addition to creating or deleting entries in tag tables 76 and 86, tag table managers 72 and 82 can operate to (1) identify instances where mirrors M0 and M1 are out of synchronization or (2) delete matching entries in tag tables 76 and 86. FIG. 6 illustrates these operational aspects of tag table manager 72. The operational aspects shown in FIG. 6 can be initiated at any time. For example, the process shown in FIG. 6 can be initiated after failure of host 42.

After the process is started in step 90, tag table manager 72 selects an entry in tag table 76 as shown in step 94 and then sends a message to tag table manager 82 asking if there is a corresponding match within tag table 86. The message sent to tag table manager 82 identifies the tag and logical block number or range of logical block numbers of the tag selected in step 92. Tag table manager 82 accesses tag table 86 using tag and logical block number or range of logical block numbers of the entry selected in step 92 that is provided in the message sent by tag table manager 72, and determines if a match exists as shown in step 94. If tag table manager 82 finds an entry in table 86 that matches the entry selected in table 76 (i.e., an entry in table 86 has an identical tag and an identical logical block number or range of logical block numbers as that of the entry selected in step 92), then tag table manager deletes the matching entry in table 86 and sends a reply message to tag table manager 72 indicating that table 86 did include a match to the entry selected in step 92. Tag manager 72, in response to receiving the message from tag table manager 82 that a matching entry did exist, deletes the entry selected in step 92. The entry deletion by tag managers 72 and 82 is shown in step 96. However, if tag table 86 does not have a match to the entry selected in table 76, then a message to that effect is sent back to tag table manager 72 and the process proceeds to step 100. In step 100, data is copied from mirror M0 to mirror M1. More particularly, the data contents of the logical memory block or range of logical memory blocks in mirror M0 that are identified by the entry selected in step 92, is copied to mirror M1 at the logical memory block or range of logical memory blocks identified by the entry selected in step 92. For example, assuming the selected entry in step 92 is entry m of table 76, the data contents of logical block 30 of mirror M0 is copied to logical block 30 of mirror M1 in step 100. After copying data from mirror M0 to mirror M1 in step 100, tag table manager 72 deletes the entry selected in table 76 as shown in step 104. Thereafter, as shown in step 104, tag table manager 72 checks tag table 76 to see if any tag entries remain. If an entry remains, then it is selected in step 92, and steps 94-102 are repeated. If no additional entries remain in table 76 at step 104, the process ends.

It is noted that tag table manager 82 operates under a process similar to that shown in FIG. 6. In particular, tag table manager 82 selects an entry in tag table 86 and sends a message to tag table manager 72 asking if there is a corresponding match within tag table 76. The message sent to tag table manager 72 identifies the tag and logical block number or range of logical block numbers of the tag selected in table 86. Tag table manager 72 accesses tag table 76 using tag and logical block number or range of logical block numbers of the selected entry of table 86 provided in the message sent by tag table manager 82, and determines if a match exists in table 76. If tag table manager 72 finds an entry in table 76 that matches the entry selected in table 86 (i.e., an entry in table 76 has an identical tag and an identical logical block number or range of logical block numbers as that of the entry selected in table 86), then tag table manager 72 deletes the matching entry in table 76 and sends a reply message to tag table manager 82 indicating that table 76 did include a match to the entry selected in table 86. Tag manager 82, in response to receiving the message from tag table manager 72 that a matching entry did exist in table 76, deletes the selected entry in table 86. However, if tag table 76 does not have a match to the entry selected in table 86, then a message to that effect is sent to tag table manager 82 and data is copied from mirror M1 to mirror M0.

More particularly, the data contents of the logical memory block or range of logical memory blocks in mirror M1 that are identified by the entry selected in table 86 is copied to the logical memory block or range of logical memory blocks identified by the entry selected in table 86 but contained in mirror M0. After copying data from mirror M1 to mirror M0, tag table manager 82 deletes the selected entry in table 86. Thereafter, tag table manager 82 checks tag table 86 to see if any tag entries remain. If an entry remains, then it is selected, and the foregoing steps are repeated. If no additional entries remain in table 86, the process ends.

If host 42 crashes after sending a write IO transaction to disk array 44 but before sending the same IO transaction to disk array 46, that will leave M0 and M1 in inconsistent state. Before host 42 is restarted, synchronization authority will generate and send a message to disk arrays 44 and 46 instructing them to bring M0 and M1 into a consistent state as described by the foregoing sections.

While a resynchronization of mirrors M0 and M1 occur after, for example a crash of host 42, it may be necessary to suspend host 42 from further generation of IO transactions to write data to mirrors M0 and M1 until mirrors M0 and M1 are brought back into a consistent state.

As noted above, storage subsystems may take form in OSDs. In this embodiment, tag tables, such as tag tables 76 and 86, my have to be modified to include an object number and information indicating whether the corresponding write operation is overwriting existing data of the storage object or whether the corresponding write operation extends the file length.

It was noted above that in an alternative embodiment, the tag generator may be placed in one of the disk arrays 44 or 46. In this alternative embodiment, host 42 could forward the IO transaction from application 52 to disk array 44 (for example) that contains the tag generator with an instruction for disk array 44 to generate first and second write 10 transactions that contain a unique tag. The first IO transaction would be provided to the storage manager 62 while the second IO transaction is transmitted to storage manager 64 in disk array 46.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
   in response to a request to write data to a mirrored volume, a computer system generating first and second write transactions, wherein
   the first write transaction comprises a first tag, and
   the second write transaction comprises a second tag;
   transmitting the first and second write transactions to first and second storage devices, respectively;
   wherein the first write transaction further comprises data D to be written; wherein the second write transaction further comprises data D to be written;
   storing first write information in an entry of a first tag table, wherein the first write information comprises the first tag and an identity of a logical block of a first mirror where data D is to be written, wherein the first tag table is stored in first memory;
   storing second write information in an entry of a second tag table, wherein the second write information comprises the second tag and an identity of a logical block of a second mirror where data D is to be written, wherein the second tag table is stored in second memory;
   synchronizing the first and second mirrors after storing the first write information in the entry of the first tag table and after storing the second write information in the entry of the second tag table;
   generating a first token after the first information is stored in the entry of the first tag table, wherein the first token identifies the entry of the first tag table;
   generating a second token after the second information is stored in the second tag table, wherein the second token identifies the entry of the second tag table;
   transmitting the first and second tokens to the computer system;
   in response to a second request to write data to the mirrored volume, the computer system generating third and fourth write transactions, wherein the third write transaction comprises a third tag and the first token, and the fourth write transaction comprises a fourth tag and the second token;
   transmitting the third and fourth write transactions to first and second storage devices, respectively;
   deleting the entry of the first tag table in response to the first storage device receiving the first token;
   deleting the entry of the second tag table in response to the second storage device receiving the second token.

2. The method of claim 1 further comprising:
   generating third and fourth write transactions, wherein the third and fourth write transactions comprise third and fourth tags, respectively;
   transmitting the third and fourth write transactions to the first and second storage devices, respectively.

3. The method of claim 1 wherein:
   the first write transaction comprises data D to be written to a range of logical blocks of the first mirror;
   the second write transaction comprises data D to be written to a range of logical blocks of the second mirror.

4. The method of claim 3 wherein the first write information comprises an identity of the first mirror, and an identity of the range of logical blocks of the first mirror where data D is to be written, the second write information comprises an identity of the second mirror, and an identity of the range of logical blocks in the second mirror where data D is to be written.

5. The method of claim 1 further comprising comparing the contents of one entry in the first tag table with the contents of entries in the second tag table to determine whether the second tag table includes an entry that matches the one entry.

6. The method of claim 5 further comprising copying data, associated with the logical block number identified by the one entry, from the first mirror to the logical block in the second mirror if the second table lacks an entry with contents matching the contents of the one entry.

7. The method of claim 5 further comprising deleting the one entry in the first table if the second table contains an entry with contents that match the contents of the one entry.

8. The method of claim 7 further comprising deleting the entry in the second table with contents that match the contents of the one entry.

9. The method of claim 1 further comprising:
   incrementing a counter in response to generating the write request;
   generating the first and second tags as a function of an output of the incremented counter.

10. The method of claim 1 wherein the first and second storage devices comprise first and second object storage devices, respectively.

11. The method of claim 1 wherein:
the first write transaction comprises data D to be written to an extension of the first mirror;
the second write transaction comprises data D to be written to an extension of the second mirror.

12. The method of claim 11 further comprising:
the first write information comprising an identity of the first mirror, and an indication that data D is to be stored in the extension of the first mirror the second write information comprising an identity of the second mirror, and an indication that data D is to be stored in the extension of the second mirror.

13. The method of claim 1 further comprising:
synchronizing said first and second storage devices in response to an entry of the first tag table not matching an entry of the second tag table.

14. A method comprising:
in response to a write request to write data, a computer system generating first and second write transactions;
wherein the first and second write transactions comprise first and second tags, respectively, wherein the first and second tags are identical to each other;
transmitting the first and second write transactions to first and second storage devices, respectively;
wherein the first write transaction comprises data D;
wherein the second write transaction comprises data D;
storing first write information in an entry of a first tag table, wherein the first write information comprises the first tag and an identity of a logical block of a first mirror where data D is to be written, wherein the first tag table is stored in first memory;
storing second write information in an entry of a second tag table, wherein the second write information comprises the second tag and an identity of a logical block of a second mirror where data D is to be written, wherein the second tag table is stored in second memory;
synchronizing the first and second mirrors after storing the first write information in the entry of the first tag table and after storing the second write information in the entry of the second tag table;
generating a first token after the first information is stored in the entry of the first tag table, wherein the first token identifies the entry of the first tag table;
generating a second token after the second information is stored in the second tag table, wherein the second token identifies the entry of the second tag table;
transmitting the first and second tokens to the computer system;
in response to a second request to write data to the mirrored volume, the computer system generating third and fourth write transactions, wherein the third write transaction comprises a third tag and the first token, and the fourth write transaction comprises a fourth tag and the second token;
transmitting the third and fourth write transactions to first and second storage devices, respectively;
deleting the entry of the first tag table in response to the first storage device receiving the first token;
deleting the entry of the second tag table in response to the second storage device receiving the second token.

15. The method of claim 1:
wherein the first and second tags are generated by a first tag generator;
a second computer system generating third and fourth transactions in response to generation of a write transaction by a second application executing on the second computer system;
wherein the third and fourth write transactions comprise third and fourth tags, respectively, wherein the third and fourth tags are generated by a second tag generator.

16. One or more computer readable storage mediums storing executable instructions, wherein a method is implemented in response to executing the instructions, the method comprising:
in response to receiving a first transaction comprising a first tag and data D, storing first write information in an entry of a first tag table, wherein the first write information comprises the first tag and an identity of a logical block of a first mirror of a mirrored volume where the data D is to be written, wherein the first tag table is stored in first memory, wherein the first transaction is generated by a computer system;
in response to receiving a second write transaction comprising a second tag and data D, storing second write information in an entry of a second tag table, the second write information comprising the second tag and an identity of the logical block of a second mirror of the mirrored volume where data D is to be written, wherein the second tag table is stored in second memory, wherein the second transaction is generated by the computer system;
synchronizing the first and second mirrors after storing the first write information in the entry of the first tag table and after storing the second write information in the entry of the second tag table;
generating a first token after the first information is stored in the entry of the first tag table, wherein the first token identifies the entry of the first tag table;
generating a second token after the second information is stored in the second tag table, wherein the second token identifies the entry of the second tag table;
transmitting the first and second tokens to the computer system;
in response to a second request to write data to the mirrored volume, the computer system generating third and fourth write transactions, wherein the third write transaction comprises a third tag and the first token, and the fourth write transaction comprises a fourth tag and the second token;
transmitting the third and fourth write transactions to first and second storage devices, respectively;
deleting the entry of the first tag table in response to the first storage device receiving the first token;
deleting the entry of the second tag table in response to the second storage device receiving the second token.

17. The one or more computer readable memories of claim 16 wherein:
the first write transaction comprises data D to be written to a range of logical blocks of the first mirror;
the second write transaction comprises data D to be written to a range of logical blocks of the second mirror.

18. The one or more computer readable memories of claim 17 wherein:
the first write information comprises an identity of the first mirror, and an identity of the range of logical blocks of the first mirror where data D is to be written;
the second write information comprises an identity of the second mirror, and an identity of the range of logical blocks in the second mirror where data D is to be written.

19. The one or more computer readable memories of claim 16 wherein the method further comprises comparing the contents of one entry in the first tag table with the contents of entries in the second tag table to determine whether the second tag table includes an entry that matches the one entry.

20. The one or more computer readable memories of claim 19 wherein the method further comprises copying data, associated with the logical block number identified by the one entry, from the first mirror to the logical block in the second mirror if the second table lacks an entry with contents matching the contents of the one entry.

21. The one or more computer readable memories of claim 19 wherein the method further comprises deleting the one entry in the first table if the second table contains an entry with contents that match the contents of the one entry.

22. The one or more computer readable memories of claim 21 wherein the method further comprises deleting the entry in the second table with contents that match the contents of the one entry.

23. A method comprising:
  a request to write data to a mirrored volume, a storage manager generating first and second write transactions;
  generating first and second tags;
  transmitting the first write transaction to a first storage device;
  transmitting the second write transaction to a second storage device;
  transmitting the first tag to the first storage device;
  transmitting the second tag to the second storage device;
  wherein the first write transaction comprises data D to be written;
  wherein the second write transaction comprises data D to be written;
  receiving the first write transaction at the first storage device;
  receiving the first tag at the first storage device;
  storing the first write information in an entry of a first tag table, wherein the write information comprises the first tag and an identity of a logical block of a first mirror where data D is to be written, wherein the first tag table is stored in first memory;
  receiving the second write transaction at the second storage device;
  receiving the second tag at the second storage device;
  storing the second write information in an entry of a second tag table, wherein the write information comprises the second tag and an identity of a logical block of a second mirror where data D is to be written, wherein the second tag table is stored in second memory;
  synchronizing the first and second mirrors after storing the first write information in the entry of the first tag table and after storing the second write information in the entry of the second tag table;
  generating a first token after the first information is stored in the entry of the first tag table, wherein the first token identifies the entry of the first tag table;
  generating a second token after the second information is stored in the second tag table, wherein the second token identifies the entry of the second tag table;
  transmitting the first and second tokens to the computer system;
  in response to a second request to write data to the mirrored volume, the computer system generating third and fourth write transactions, wherein the third write transaction comprises a third tag and the first token, and the fourth write transaction comprises a fourth tag and the second token;
  transmitting the third and fourth write transactions to first and second storage devices, respectively;
  deleting the entry of the first tag table in response to the first storage device receiving the first token;
  deleting the entry of the second tag table in response to the second storage device receiving the second token.

* * * * *